May 14, 1968 P. E. GOODALE 3,383,548
SAMPLING OSCILLOSCOPE IN WHICH THE VERTICAL DEFLECTION SIGNAL
IS DERIVED FROM PULSE WIDTH MODULATED CONSTANT CURRENT PULSES
Filed Feb. 3, 1964 9 Sheets-Sheet 1

FIG. 1

INVENTOR.
PAUL E. GOODALE
BY
Lehr and Swain
ATTORNEYS

FIG. 3

INVENTOR.
PAUL E. GOODALE
BY
*Flehr and Swain*
ATTORNEYS

FIG. 5

INVENTOR.
PAUL E. GOODALE
BY
Flehr and Swain
ATTORNEYS

FIG. 6

INVENTOR.
PAUL E. GOODALE
ATTORNEYS

INVENTOR.
PAUL E. GOODALE
BY
ATTORNEYS

FIG. 9

INVENTOR.
PAUL E. GOODALE
BY
ATTORNEYS

INVENTOR.
PAUL E. GOODALE
ATTORNEYS

United States Patent Office 3,383,548
Patented May 14, 1968

3,383,548
SAMPLING OSCILLOSCOPE IN WHICH THE VERTICAL DEFLECTION SIGNAL IS DERIVED FROM PULSE WIDTH MODULATED CONSTANT CURRENT PULSES
Paul E. Goodale, Pleasant Hill, Calif., assignor to E-H Research Laboratories, Inc., Oakland, Calif., a corporation of California
Filed Feb. 3, 1964, Ser. No. 342,105
17 Claims. (Cl. 315—25)

This invention relates generally to oscilloscopes and more particularly to broad band, high sensitivity oscilloscopes.

One type of prior art broad band, high sensitivity oscilloscope is known as a sampling oscilloscope. The sampling oscilloscope presents a display which is made up of a plurality of discrete points whose position on the vertical axis of the display tube is dependent upon the amplitude of the input waveform taken at progressively later points on succeeding occurrences of a repetitive waveform. The samples are obtained by using a sampling pulse which is generated in synchronism with the trigger pulse but which is progressively delayed with respect thereto so that it progressively samples succeeding portions of the repetitive waveform. The horizontal sweep controlled by a step or staircase voltage causes the display to step horizontally across the display tube, one step for each sample.

Since the sampling circuitry is, in general, located at the input to the oscilloscope, the amplification and display takes place on the samples and, as a result, conventional circuitry can be employed. This gives broad band width, high sensitivity performance since only slow, successive samples of many repetitive waveforms are taken for the display.

Circuits for giving the delayed sampling pulses in the prior art are relatively complex and expensive. The motion of the spot, particularly at slow horizontal scan speeds, may be distracting because the motion is stepwise. In certain instances, the display will merely be a series of spots.

It is an object of the present invention to provide an improved broad band, high sensitivity oscilloscope.

It is another object of the present invention to provide an oscilloscope including improved delayed pulse circuits.

It is another object of the invention to provide a sampling type oscilloscope having improved signal to noise ratio at high sensitivity.

It is still another object of the present invention to provide a broad band, high sensitivity oscilloscope in which the vertical deflection signal is derived from fixed amplitude pulses which are pulse width modulated in response to successive portions of the signal waveforms.

It is another object of the present invention to provide an oscilloscope in which constant amplitude pulses are pulse width modulated and compared with reference pulses to derive an output signal which is independent of variations in circuit characteristics.

It is another object of the present invention to provide an oscilloscope in which an input signal is compared to a current ramp which is progressively delayed for succeeding waveforms and which, in turn, forms an output pulse which is modulated timewise in response to the amplitude of the input signal.

It is a further object of the present invention to provide a sampling oscilloscope in which the output signal is independent of the variations in amplitude of the sampling signal.

The foregoing and other objects of the invention will become more clearly apparent from the following description taken in conjunction with the accompanying drawing.

Referring to the drawing.

Figure 1:
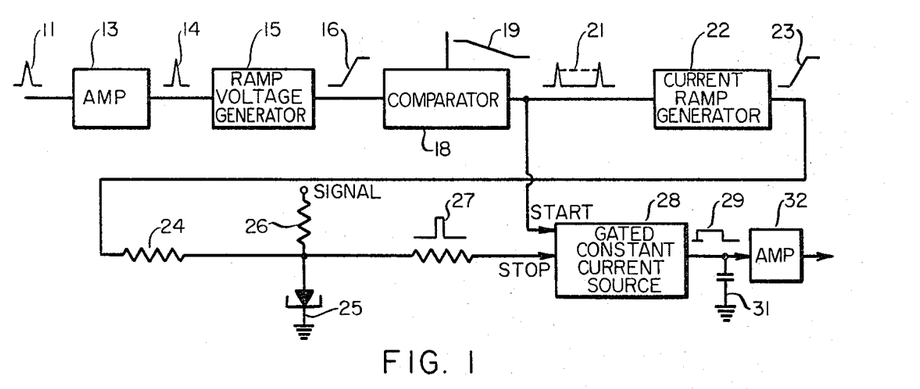
FIGURE 1 is a schematic circuit in block diagram form of one embodiment of the invention.

Referring particularly to FIGURE 1, there is shown a circuit, partly in block diagram form, for providing the vertical deflection signal for an oscilloscope. In FIGURE 2, there are shown typical waveforms at various points on the circuit of FIGURE 1.

Figure 2A:
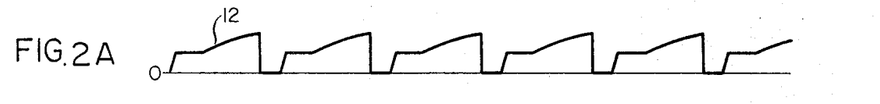
FIGURES 2A–2H show the waveforms of various points in the circuit of FIGURE 1.
Figure 2B:
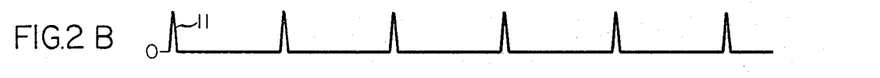
Figure 2C:
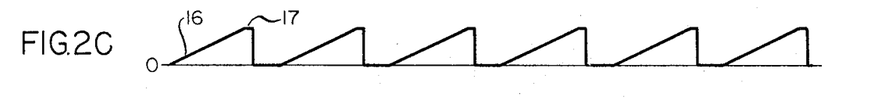
Figure 2D:
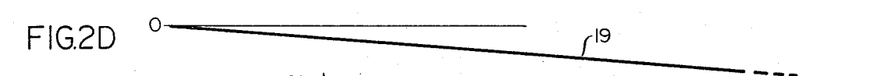

A trigger pulse 11, FIGURES 1 and 2B, which is in synchronism with the input waveform 12, FIGURE 2A, is applied to the circuit. The trigger pulse 11 may be generated in response to the input waveform, or may be a trigger signal from the circuits which form the input waveform 12.

The trigger pulse 11 is applied to an amplifier 13 and is, in turn, applied to a ramp voltage generator 15. A suitable ramp voltage generator might, for example, be a Miller integrator which is triggered by the amplified pulse 14. The Miller integrator, in turn, provides a ramp voltage 16, FIGURE 2C, which ramp begins in synchronism with the triggering pulse 11 and continues for a predetermined time to the level 17. The Miller integrator then reverts to its starting state in readiness for the next pulse. The ramp voltage 16 is selected to have a predetermined rise time and, of course, occurs at a frequency which corresponds to that of the trigger pulses 11. The ramp voltage 16 is applied to an amplitude comparator 18 which has applied thereto a decreasing ramp voltage 19. The ramp voltage 19 may be a voltage derived from the horizontal deflection signal for the display tube of the oscilloscope. It is noted that the frequency of the horizontal ramp voltage 19 is relatively low in comparison to the frequency of the triggered ramp voltage 16. As will become presently apparent, by employing ramp voltages having two frequencies and comparing the same, output pulses which are progressively delayed with respect to the triggering pulses are formed. The delayed pulses are delayed in synchronism with the horizontal deflection signal for the display tube. The horizontal deflection may, therefore, be continuously swept as the voltage pulses are generated to provide a continuous rather than stepwise horizontal sweep.

Figure 2E:
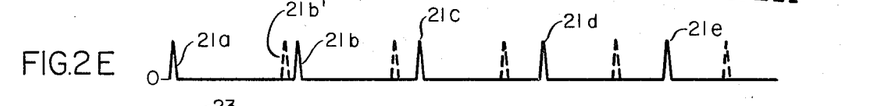
Figure 2F:
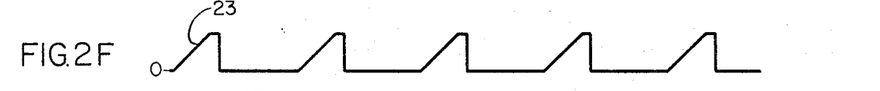
Figure 2G:
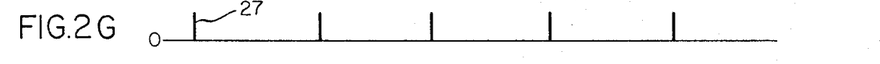
Figure 2H:
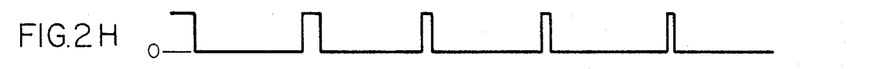

The comparator 18 is an amplitude comparator circuit which receives the two ramp voltages in a summing network and forms an output pulse when the sum of the voltages reaches a predetermined amplitude. The output pulses from the comparator 18 are shown at 21, FIGURES 1 and 2E. Referring to FIGURE 2E, it is seen that the first pulse 21 is generated at the occurrence of the trigger pulse 11. The pulse 21b is delayed as indicated by the delay between the dotted pulse representation 21b', which corresponds to the occurrence of the next trigger pulse 11, and the actual pulse 21b which is formed by the delayed pulse generating circuit including ramp generator 15 and comparator 18. The formation of this pulse may be more clearly understood by addition of ramp voltages 16 and 19. When the sum reaches a predetermined amplitude, a trigger pulse 21 is formed. Since the ramp voltages are of opposite sign, the generated pulse is delayed progressively as the ramp voltage 16 reoccurs. Thus, it is seen that the pulses in FIGURE 2E are progressively delayed an amount which is in exact synchronism with the horizontal sweep signal 19. In order to change the amount of delay for each cycle, the ratio of frequencies of the ramp voltages 16 and 19 is changed.

The pulses 21 are applied to a current ramp generator 22, which again may be a Miller integrator circuit. However, the current ramp generator 22 is a relatively high frequency circuit to provide a relatively short, fast rise ramp, on the order of 10 nanoseconds or less. The ramp pulses are shown at 23 in FIGURE 2F. This current ramp is applied through a resistor 24 to one terminal of tunnel diode 25 which serves as an amplitude comparator. The input waveform 12 is also applied to this terminal of the tunnel diode through a resistor 26. Thus, the sum of the two voltages appears at the one terminal of the tunnel diode 25. As is well known, a tunnel diode is a device which, in response to a predetermined current, will switch from a first voltage to a second higher voltage thereby generating an output pulse. Thus, the tunnel diode 25 acts as an amplitude comparator and provides an output pulse 27 each time that the sum of the signal voltage and the ramp voltage reaches a predetermined amplitude. It is observed that the timing of the output pulses 27 is dependent upon the sum of the input waveform and the current ramp voltage and, therefore, the output pulses 27 will be time modulated within the period of the current ramp voltage in accordance with the amplitude of the input signal.

The output pulses 27 and the delayed pulses 21 from the comparator are applied to a gated constant current source 28. The delayed pulses 21 from the comparator serve to start the constant current source to provide a constant amplitude output current. The pulses 27 serve to stop the gated current source. The pulse width of the output pulses 29 is determined by the pulses 27. Since the pulses 27 will be modulated timewise with respect to the pulses 21 in accordance with the amplitude of the input signal, the output pulses shown in FIGURE 2H will be pulse width modulated in accordance with the signal 12. The average value of the pulses 29 will be dependent upon the variations in amplitude of the signal as it is successively sampled.

Thus, one complete sweep of the horizontal deflection plate samples from a large number of input waveforms. The average current at any time in the pulses 29 is dependent upon the amplitude of the input waveform at that time whereby the display will show a continuous trace which, in effect, is made up of the time average of the pulses as the time average appears across the capacitor 31.

Thus, by a sampling technique, it is possible to observe rapid waveforms and yet to employ conventional amplifiers such as the amplifier 32 in the oscilloscope circuit since the amplifier must only respond to a relatively slow changing waveform.

Figure 3:
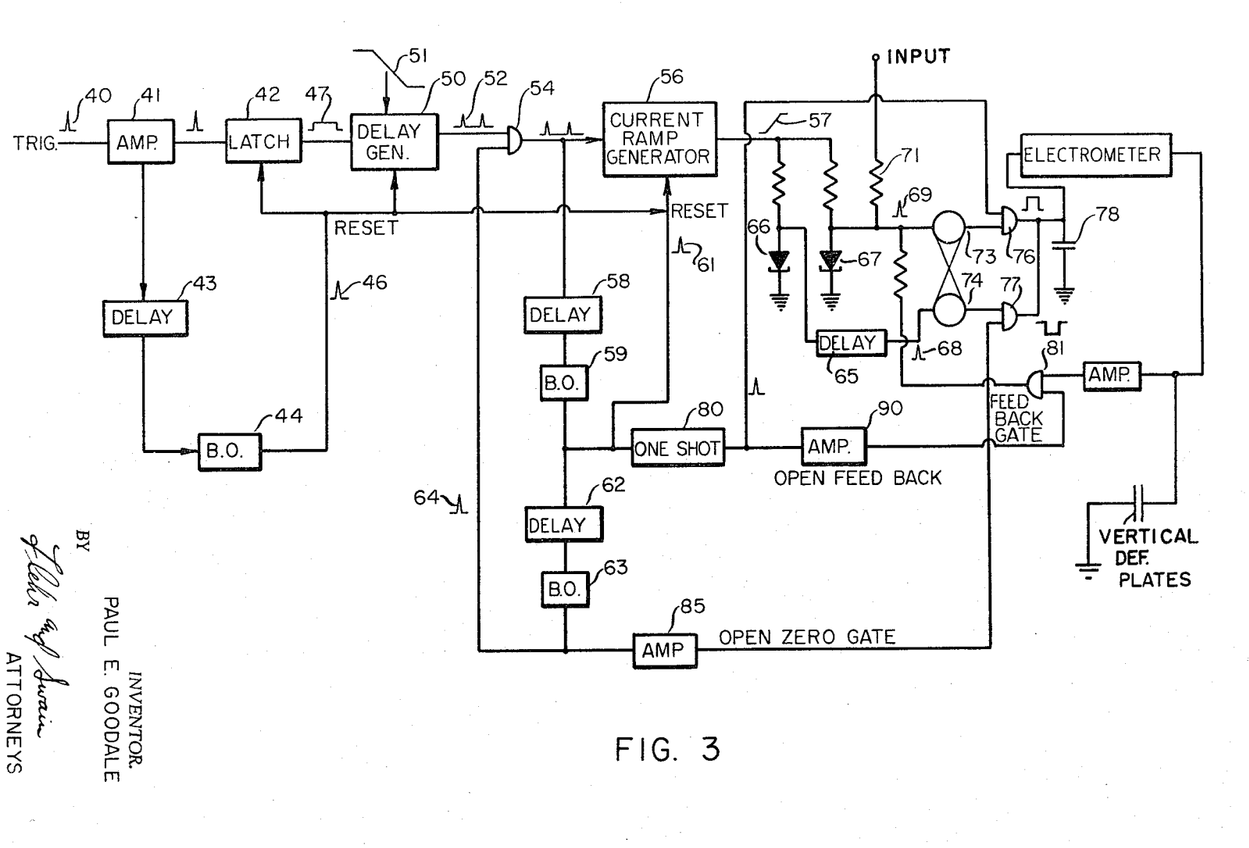
FIGURE 3 is a schematic circuit in block diagram form of another embodiment of the invention.

Referring to FIGURE 3, there is shown a block diagram of another circuit for generating a vertical deflection signal. The circuit shown in FIGURE 3 employs a balanced output arrangement whereby effects of variations in the level of the constant current source are minimized as well as variations in characteristics of circuit components due to temperature variations and the like.

Figure 4A:
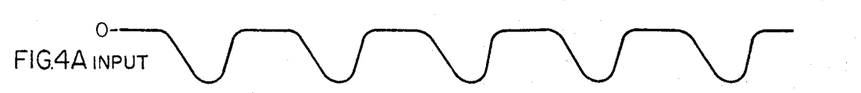
FIGURES 4A–4Q show the waveforms of various points in the circuit of FIGURE 3.
Figure 4B:
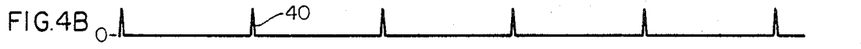
Figure 4C:
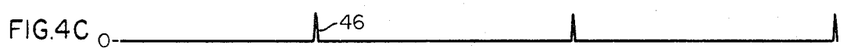

The trigger pulses 40 are amplified by the amplifier 41 and applied to a latch circuit 42. The latch circuit is, in essence, a bistable circuit switched to one of its stable states by the trigger pulse 40, FIGURE 4B. It remains in this stable state until a reset pulse is applied thereto, at which point it is switched back to its other state. The reset pulse is generated by taking the amplified trigger pulse, delaying the same in a delay circuit 43, and applying it to a blocking oscillator 44 to form a reset pulse 46, FIGURE 4C, having the desired delay which, for example, may be in the order of 1.0 microsecond.

Figure 4D:
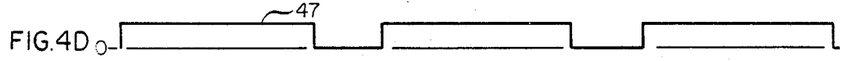

Thus, the length of the output pulse 47, FIGURE 4D, from the latch will be latched for a 1.0 microsecond pulse.

Figure 4E:
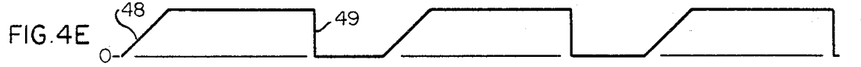
Figure 4F:
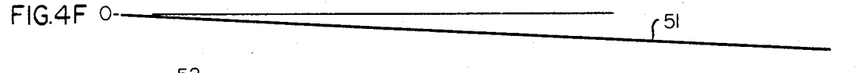
Figure 4G:
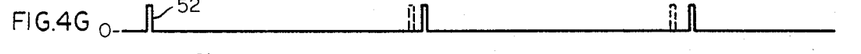

The latch pulse 47 is applied to a delay generator which includes a Miller integrator circuit which forms a first ramp voltage of predetermined rise time as indicated at 48, FIGURE 4E. The ramp voltage generator is reset by the reset pulse 46, FIGURE 4C, as shown at 49, FIGURE 4E. The ramp voltage 51, FIGURE 4F, is also applied to the delay generator. The ramp voltage may correspond to the horizontal deflection voltage. The internally generated ramp voltage and the horizontal deflection voltage are compared as before and serve to generate output pulses 52, FIGURE 4G. The pulses are again formed so that the pulses are progressively delayed with respect to the trigger pulse as previously described and as indicated by the original position shown in dotted line in FIGURE 4G.

Figure 4H:
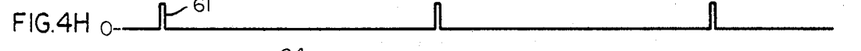
Figure 4I:
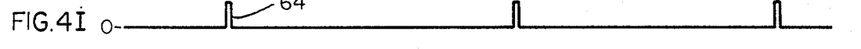
Figure 4J:
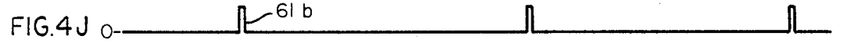
Figure 4K:
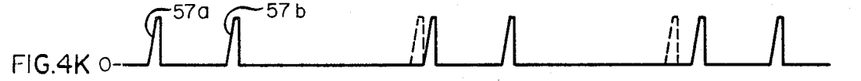

These pulses are applied through an OR gate 54 to a current ramp generator 56 which generates a rapidly rising current ramp 57, FIGURE 4K, in the manner previously described. The pulses are also applied through a delay circuit 58 to a blocking oscillator 59 which serves to form a reset pulse 61, FIGURE 4H, which is delayed with respect to the triggering pulse and, for example, may be delayed in the order of 20 nanoseconds whereby the current ramp generator is reset almost instantaneously after the formation of current ramp voltage.

The pulse 61 from the blocking oscillator 59 is also applied to another delay circuit 62 which triggers a blocking oscillator 63 and, in turn, provides a delayed pulse 64, FIGURE 4I, which is applied to the OR gate 54.

The pulse 64 serves to again trigger the current ramp generator 56 which is immediately reset by a second pulse 61b, FIGURE 4J, generated through the blocking oscillator circuit 59.

Thus, there is formed a pair of ramp current pulses 57a, 57b which are delayed a predetermined time with respect to one another. The first is generated in response to the trigger pulse 40, and the second is internally generated while the latch 42 is still in its latched condition.

Figure 4L:
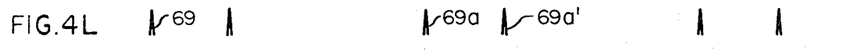
Figure 4M:
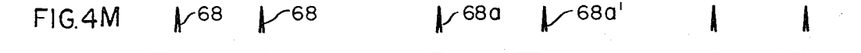

The spaced current ramp pulses 57a, 57b are applied to a pair of tunnel diodes 66 and 67. Each of these tunnel diodes serves to form a triggering pulse 68 and 69, FIGURES 4M and 4L, respectively. The triggering pulse from the tunnel diode 66 is delayed a predetermined amount by the delay circuit 65 and is shown at 68, FIGURE 4M, delayed with respect to the triggering pulses 69 from the other tunnel diode. Assuming no input signal through the resistor 71, then each of the tunnel diodes will be triggered at the same instant in the first input ramp 57a and will form the output pulses 68 and 69 which are delayed with respect to one another an amount corresponding to the fixed delay introduced by the circuit 65. The second, internally generated pulse 57b likewise will form a pair of pulses, one delayed with respect to the other by the same amount.

The next pair of ramp voltages 57 will be delayed a slight amount timewise with respect to the trigger pulses 40. Ramp pulse 57a may occur at a point in time where there is present a negative input signal. The sum of the input signal and the ramp voltage 57a will be such as to delay the occurrence of the triggering pulse 69 as indicated at 69a. However, the delayed pulse 68a will still occur at the same predetermined interval since it will be triggered at the same point in the ramp voltage 57. Thus, the time difference between the pulses 68a and 69a is reduced by the input voltage. However, the second internally generated ramp voltage will occur at a point in the input waveform which is zero and, therefore, the pulses 68a and 69a will occur at the previously predetermined delay with respect to one another. To assure the absence of input signal, a gate controlled by the pulses can be inserted in series with the input terminal. Subsequent pulses act in a similar manner. The pulse 69 is employed to activate a bistable current generating circuit or flip-flop. With the pulse 69 applied, the circuit will revert to one of its stable positions and with the subsequent occurrence of the pulse 68, it will revert to its other stable condition.

Figure 4N:
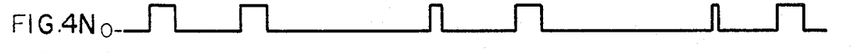
Figure 4O:
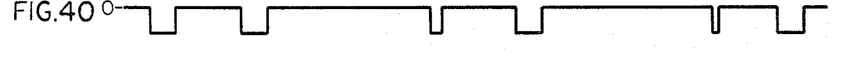
Figure 4P:
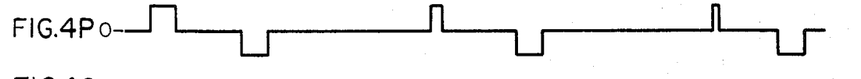

FIGURES 4N and 4O show the output waveforms appearing at the output terminals 73 and 74. These waveforms are applied to the gates 76 and 77, respectively. The gate 77 is normally closed and the gate 76 normally open whereby the first pulse is passed, as shown at FIGURE 4P, by the gate 76. However, the zeroing gate 77 is then opened and the signal gate 76 is closed to pass the next or zeroing pulse 68 which is of opposite sign, FIGURE 4P. The gating pulses for the gate 76 are generated by the one-shot multivibrator 80. The pulse for the gate 77 is derived from blocking oscillator 63 and amplified by amplifier 85.

Figure 4Q:
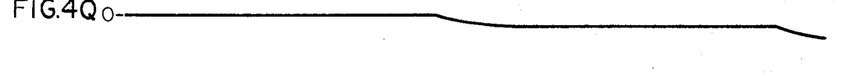

With no input signal, these two pulses will have the same pulse width. The average of the two pulses is zero and, therefore, zero charge is applied to the capacitor 78. However, in the next cycle, it is seen that the pulse through the gate 76 is considerably shorter than the pulse through the gate 77 whereby there will be a net negative signal applied to the capacitor 78. Similarly, in the following pulse, it is observed that the net is even more negative. This is illustrated in FIGURE 4Q.

Since the two pulses are generated almost simultaneously, any variations in temperature or characteristics of the device will be compensated since both the zeroing pulse and the actual pulse will be affected in a substantially similar manner.

The signal on the capacitor 78 may be applied through an electrometer for amplification and then applied through an amplifier to the feedback gate 81 which serves to feed back the signal to the input to thereby provide, in essence, an infinite impedance input and a high gain servo loop. The feedback gate 81 is opened in synchronism with the opening of the zero gate 77 and the closing of the signal gate 76 such that the feedback signal will be present during the current ramp time 57a but not present during current ramp time 57b. The pulse is obtained at the amplifier 90.

The output from the electrometer and amplifier is presented on the vertical axis of the display CRT.

Figure 5:
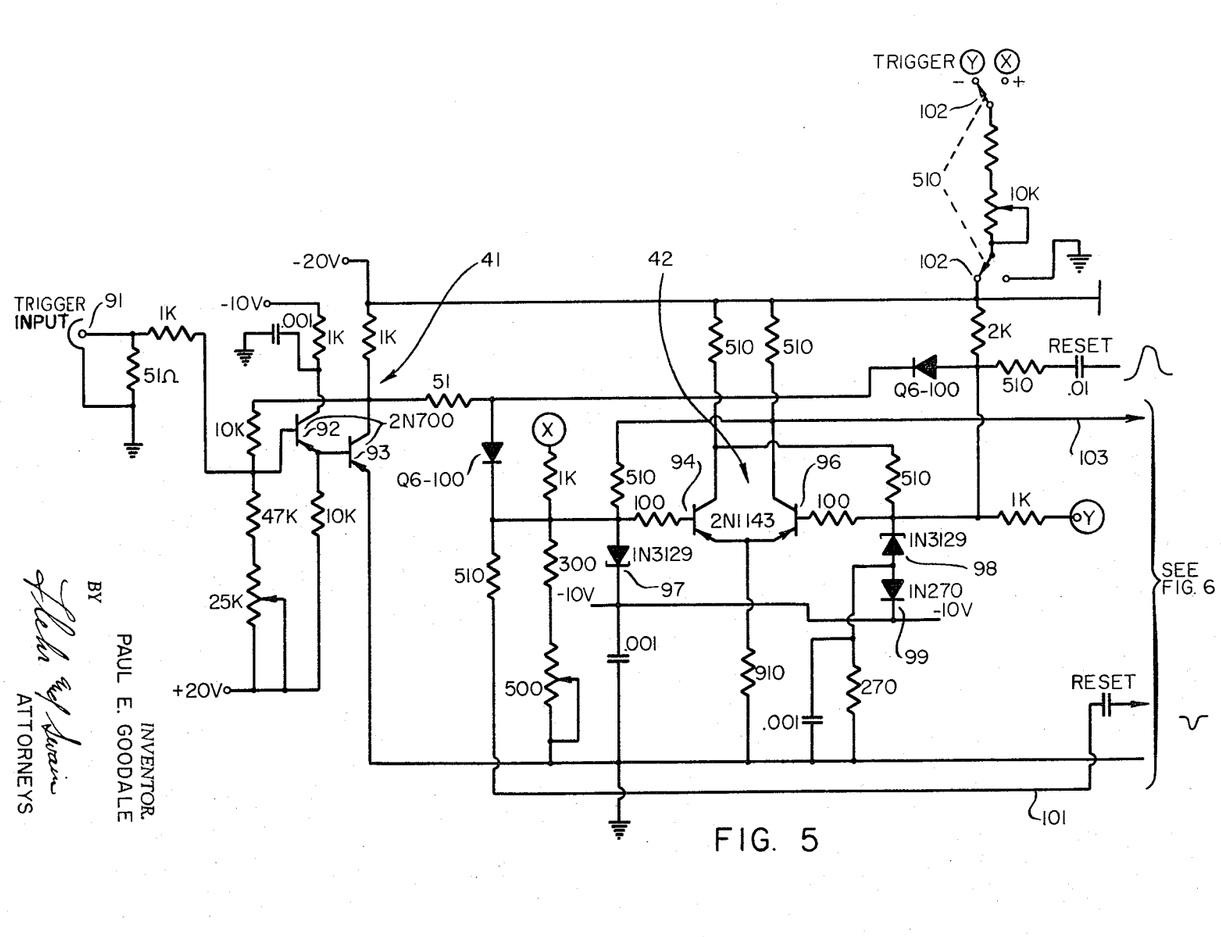
FIGURE 5 is the schematic circuit diagram of the amplifier and latch of FIGURE 3.

Referring to FIGURES 5-11, there are shown detailed circuit diagrams for the various circuits depicted in block diagram form in FIGURE 3. The amplifier 41 and latch 42 are shown in FIGURE 5. The input trigger pulse 40 is applied to the trigger input 91. The pulse is amplified by the amplifier 41 including the transistors 92 and 93 and the associated circuitry. The latching circuit 42 comprises the bistable circuit including transistors 94 and 96, tunnel diodes 97 and 98, and associated circuitry. The bistable circuit is set by the amplified trigger pulse and reset by a reset pulse applied from the reset pulse generator to be presently described along the line 101. As previously described, the latching circuit serves to lock out incoming triggers for a predetermined period of time after receiving the first trigger pulse of a series so that delayed sampling pulses will be generated at a rate not to exceed a predetermined rate.

The bistable or latching circuit may be set to respond to a positive or negative input trigger pulse by suitably setting the switch 102 which connects the associated resistive circuit either to the X or Y points as indicated in the drawing for positive or negative triggering.

Figure 6:
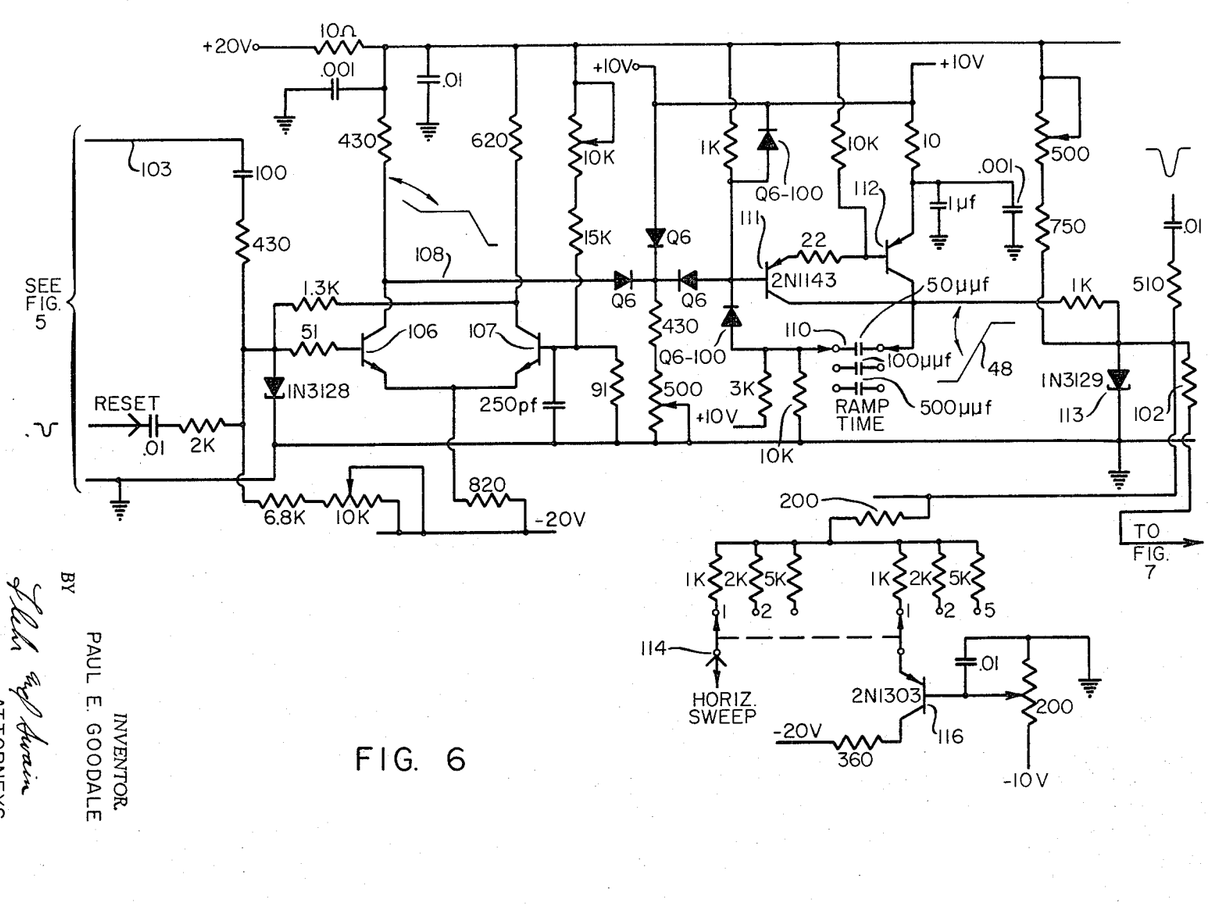
FIGURE 6 is a schematic circuit diagram of the delay generator of FIGURE 3.

The output from the bistable circuit is applied along the line 103 to the delay generator 50 shown in FIGURE 6. The delay generator includes a monostable circuit formed by the pair of transistors 106 and 107 and the associated circuitry. The output from the monostable circuit is applied along the line 108 to the base of the transistor 111 connected in an emitter follower configuration. The output of the emitter follower is connected to a second transistor 112. In combination, the two transistors and associated circuitry form a Miller integrator responsive to an input pulse to generate ramp voltage 48. The ramp voltage time base can be adjusted by setting the switch 110.

The ramp voltage is applied to tunnel diode 113 which, together with its associated circuitry, acts as a comparator. The horizontal sweep voltage is applied to the terminal 114 and thence to the circuit including the transistor 116 and associated circuitry to effectively change the slope of the horizontal sweep voltage and thus change the time base and to delay the generating of ramp currents 57, a fixed amount, and which voltage is then applied to the comparator circuit including the tunnel diode 113, previously described. The comparator forms output pulses 52 which are progressively delayed, one with respect to the other, in the manner previously described.

Figure 7:
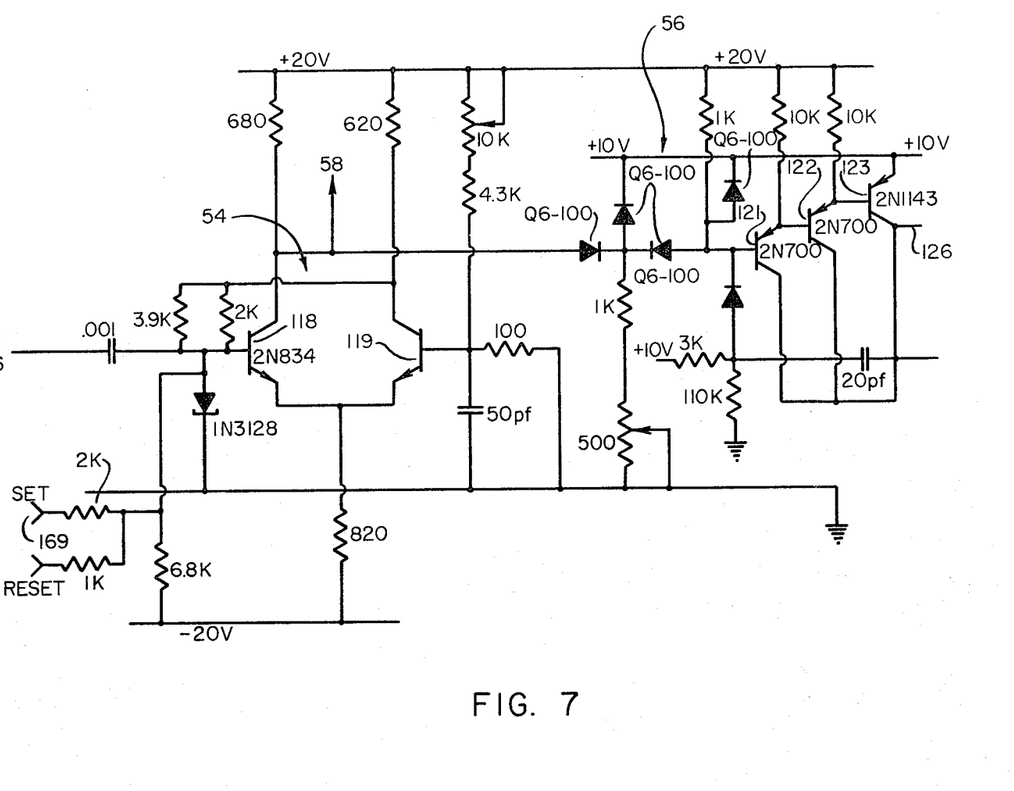
FIGURE 7 is a schematic circuit diagram of the current ramp generator of FIGURE 3.
Figure 8:
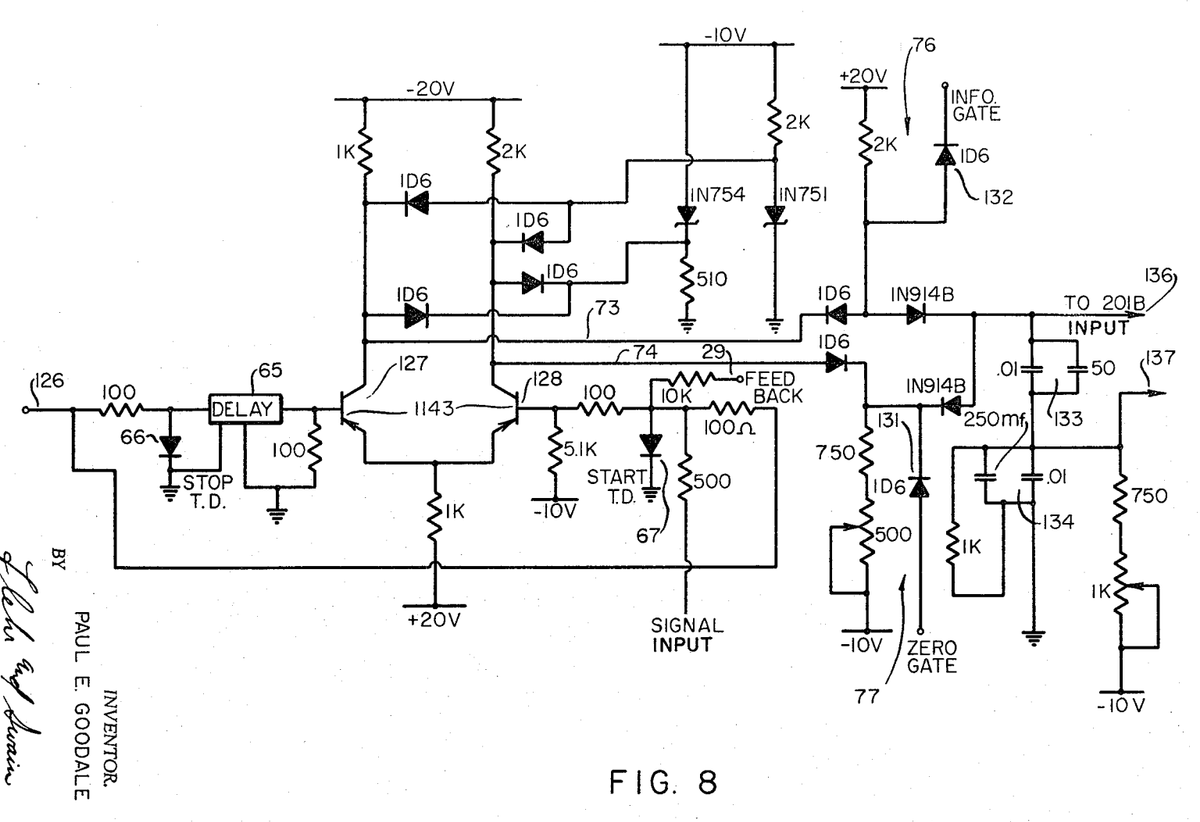
FIGURE 8 is a schematic circuit diagram of the comparator and constant current source of FIGURE 3.

The output pulse generated by the comparator is then applied to the current ramp generator 56 through gate 54. The current ramp generator is shown in FIGURE 7. Transistors 118 and 119, and associated circuitry, form a bistable circuit, the output of which is applied to a Miller integrator including the diodes Q6, transistors 121, 122 and 123 and associated circuitry.

As described, the transistors 118 and 119 form a bistable circuit which receives a signal from the delay generator 50 and also gating signals which are indicated as the reset signal. The set signal is the signal from the delay generator 50.

The output of the Miller integrator including transistors 121-123 is obtained at the collector of the transistor 123 and is available at line 126. The current ramp voltage from the current ramp generator is applied to the first tunnel diode 66 and to the second tunnel diode 67, FIGURE 8. The output from the tunnel diode 66 is applied through the delay circuit 65 to the base of the transistor 127, while the output of the tunnel diode 67 is applied directly to the base of the transistor 128. Transistors 127 and 128 and associated circuitry form the bistable switching circuit previously described.

The feedback signal through the gate 81, FIGURE 3, is applied at the point 129. The output of the bistable circuit is applied through a pair of gates which comprise the zero gate 77 formed by the diode 131 and its associated circuitry and the signal gate 76 formed by the diode 132 and its associated circuitry. The outputs of the two gates are applied to the integrating or averaging circuit including the various capacitors 133, 134 and associated resistors. The signal is then applied along the lines 136, 137 to the input of an electrometer, FIGURE 10, which may be of the type known as EH Electrometer Model 201B. The output of the electrometer is applied to a two stage amplifier including the transistors 141 and 142 and associated circuitry. The output from the amplifier is applied to a conventional amplifier 143 such as found in standard oscilloscopes, and thence to the vertical deflection plates 144 of the cathode ray tube.

The output derived across the capacitor 146 is also employed in the feedback circuit. The feedback signal is gated by the gate circuit 81 including the diode 151 which has applied thereto a signal from the amplifier 152 and, in turn, which derives its control signal from the one-shot multivibrator 80 amplified by amplifier 90, FIGURE 3.

Figure 11:
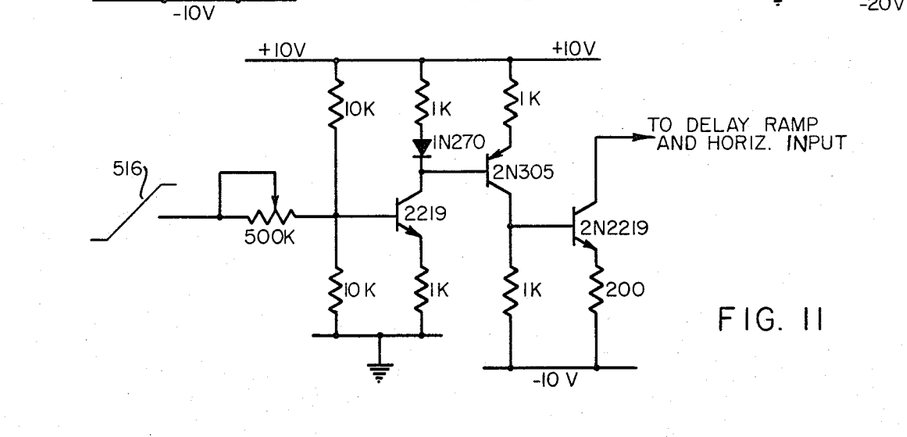
FIGURE 11 shows a circuit for forming the horizontal sweep voltage for the associated display tube.

The circuit shown in FIGURE 11 may be employed to receive the horizontal deflection voltage 51b from the oscilloscope and serve to amplify, invert and attenuate the same for application to the delay ramp generator and horizontal input.

Figure 9:
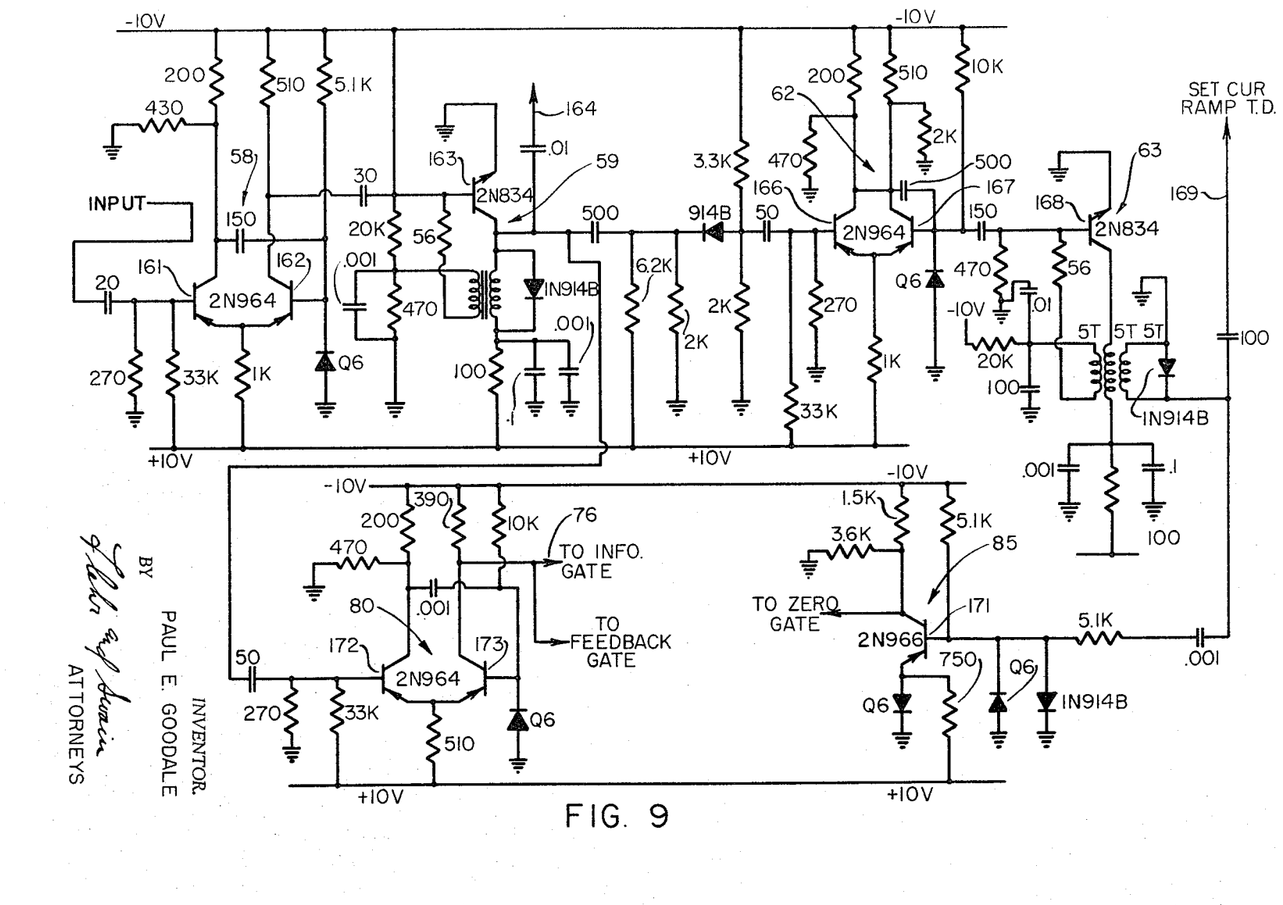
FIGURE 9 is a schematic circuit diagram of the blocking oscillators and delay circuits for forming the reset pulses and gating pulses of FIGURE 3.
Figure 10:
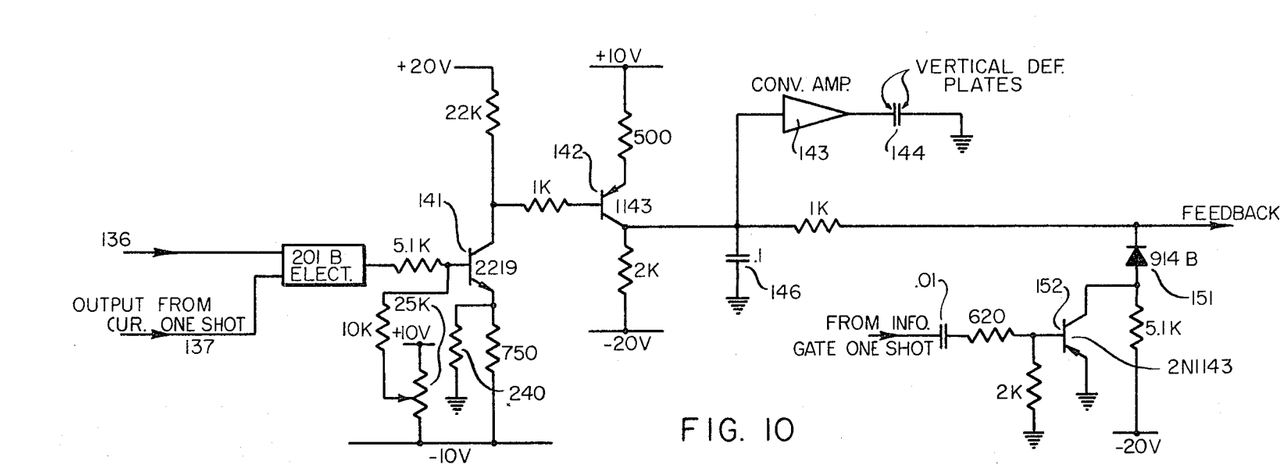
FIGURE 10 is a schematic circuit diagram of the output circuit, the feedback gate and amplifier circuits of FIGURE 3.

In FIGURE 9 are shown the circuits for generating the various control pulses. Transistors 161 and 162 form the delay generator 58 which drives the blocking oscillator 59 which includes the transistor 163 and its associated circuitry. The output of the blocking oscillator is applied along the line 164 to reset the current ramp generator. The output is also applied to a second delay circuit corresponding to the delay circuit 62 and comprising the transistors 166 and 167 whose output is, in turn, applied to the blocking oscillator including the transistor 168. The output from the blocking oscillator 63 is employed to reset the current ramp tunnel diode along the line 169, FIGURES 7 and 9. The output is also applied to the amplifier 85 including the transistor 171 and thence to the zero gate 77 previously described. The output from the blocking oscillator 59 which includes the transistor 163 is also applied to a one-slot multivibrator 80 which includes the transistors 172 and 173 and associated circuitry. The output of this one-shot is applied, in turn, to control the information gate 76 and to the amplifier 90.

A circuit in accordance with the block diagram of FIGURE 3 and the circuits of FIGURES 5–11 was constructed with the values of the various components as shown on the drawings. The following sets forth the performance of the circuit:

Band pass to approximately 15 kmc.
Noise level approximately equal to 100 micro-volts with sampling rate of 30 kc. and a horizontal sweep time of 10 milliseconds.

In summary then, there is provided a circuit for sampling the amplitude of progressive points on successive cycles of a waveform and generating another waveform having a longer time base but including the amplitude information. This latter waveform is suitable for display on an oscilloscope, for example, where the horizontal scan corresponds to the longer time base.

I claim:
1. A circuit of the character described for generating a slow signal representative of a fast repetitive waveform comprising means responsive to a trigger pulse which is in synchronism with the input waveform for generating a delayed pulse which is progressively delayed with respect to successive trigger pulses, means responsive to the delayed pulse forming a current ramp, means for receiving said current ramp and said input waveform and forming an output pulse when they have a predetermined amplitude relationship, and gate means responsive to said output pulse serving to provide an output current pulse having a variable time duration corresponding to the sampled amplitude of said repetitive waveform.

2. A circuit as in claim 1 wherein said means for receiving said current ramp and input waveform and forming an output pulse when they have a predetremined amplitude relationship comprises a tunnel diode.

3. A circuit as in claim 1 in which said last named means comprises means responsive to said trigger pulse and to said output pulse serving to form an output signal pulse having a duration equal to the time separation between said trigger pulse and output pulse.

4. A circuit as in claim 1 in which said means for receiving the current ramp and input waveform and said gate means include means for generating a first output signal pulse having a predetermined time relationship with respect to said current ramp and a second output signal pulse which has a variable time relationship with respect to the first output signal pulse which is dependent upon the ampiltude of the input waveform.

5. A circuit as in claim 4 wherein said means for generating first and second output signal pulses includes means for generating third and fourth output signal pulses having a predetermined substantially constant time relationship.

6. A circuit as in claim 5 including means providing feedback in synchronism with the generation of said first and second output signal pulses.

7. A circuit as in claim 5 including means responsive to said first and second, and third and fourth output signal pulses serving to generate a voltage which is representative of the difference between the same.

8. An oscilloscope for forming a display of a repetitive input waveform comprising a cathode ray tube having horizontal and vertical deflection means, means responsive to a trigger pulse which is in synchronism with the input waveform for generating a delayed pulse which is progressively delayed with respect to successive trigger pulses in synchronism with the horizontal sweep voltage for said cathode ray tube, means responsive to the delayed pulse forming a current ramp, means for receiving said current ramp and said input waveform and forming an output pulse when they have a predetermined relationship, and gate means connected to receive and responsive to said output pulse to provide an output current pulse having a variable time duration corresponding to the sampled amplitude of said repetitive waveform and form a vertical deflection voltage having a predetermined amplitude relationship with respect to the amplitude of said waveform.

9. A circuit as in claim 8 in which said last named means comprises means responsive to said trigger pulse and to said output pulse serving to form an output signal pulse having a duration equal to the time separation between said trigger pulse and output pulse.

10. A circuit as in claim 8 in which said means for receiving the current ramp and input waveform and said gate means include means for generating a first output signal pulse having a predetermined time relationship with respect to said current ramp and a second output signal pulse which has a variable time relationship with respect to the first output signal pulse which is dependent upon the amplitude of the input waveform.

11. A circuit as in claim 10 wherein said means for generating first and second output signal pulses includes means for generating third and fourth output signal pulses having a predetermined substantially constant time relationship.

12. An oscilloscope for forming a display of a first repetitive input waveform comprising a cathode ray tube having horizontal and vertical deflection means, means responsive to a trigger pulse which is in synchronism with the input waveform for generating a first ramp voltage in synchronism with said trigger pulse, means forming a second ramp voltage in synchronism with the horizontal sweep signal for said cathode ray tube, means for comparing the amplitude of said first and second ramp voltages and forming an output delayed pulse which is progressively delayed with respect to successive trigger pulses in synchronism with the horizontal sweep voltage, means responsive to the delayed pulse forming a current ramp, means for receiving said current ramp and said input waveform and forming an output pulse when they have a predetermined relationship, gate means responsive to said output pulse serving to provide an output current pulse having variable time duration corresponding to the sampled amplitude of said repetitive waveform.

13. A circuit as in claim 12 in which said last named means comprises means responsive to said trigger pulse and to said output pulse serving to form an output signal pulse having a duration equal to the time separation between said trigger pulse and output pulse.

14. A circuit as in claim 12 in which said means for receiving the current ramp and input waveform and said gate means include means for generating a first output signal pulse having a predetermined time relationship with respect to said current ramp and a second output signal pulse which has a variable time relationship with respect to the first output signal pulse which is dependent upon the amplitude of the input waveform.

15. A circuit as in claim 14 wherein said means for generating first and second output signal pulses includes means for generating third and fourth output signal pulses having a predetermined substantially constant time relationship.

16. An oscilloscope for forming a display of a first repetitive input waveform comprising a cathode ray tube having horizontal and vertical deflection means, means responsive to a trigger pulse which is in synchronism with the input waveform for generating a first ramp voltage in synchronism with said trigger pulse, means forming a second ramp voltage in synchronism with the horizontal deflection voltage for said cathode ray tube, a comparator means serving to receive said first and second ramp voltages and forming an output pulse which is progressively delayed with respect to the trigger pulse in synchronism with the horizontal swep voltage, a current ramp generator responsive to said delayed pulse serving to form a current ramp, amplitude comparator means serving to receive said ramp pulse and said signal voltage and forming an output pulse when said ramp voltage and signal voltage have a predetermined amplitude, and a gated constant current source responsive to the output pulse serving to provide an output current pulse having a variable time duration corresponding to the amplitude of the input repetitive waveform.

17. An oscilloscope for forming a display of a first repetitive input waveform comprising a cathode ray tube having horizontal and vertical deflection means, means responsive to a trigger pulse which is in synchronism with the input waveform for generating a first ramp voltage in synchronism with said trigger pulse, means forming a second ramp voltage in synchronism with the horizontal deflection voltage for said cathode ray tube, a comparator means serving to receive said first and second ramp voltages and forming an output pulse which is progressively delayed with respect to the trigger pulse in synchronism with the horizontal sweep voltage, a current ramp generator responsive to said delayed pulse serving to form a current ramp, first and second amplitude comparator means connected to receive said current ramp voltage, one of said amplitude comparator means additionally being connected to receive the repetitive input waveform, a bistable circuit responsive to output pulses from said first and second comparator means, a delay means connected between said other ampiltude comparator means and the terminal of said bistable circuit coupled to said other amplitude comparator, gating means connected to each of the output terminals of the bistable circuit, means for controlling said gates whereby upon successive current ramps alternate gates are opened, means for receiving the output of said gates and forming an average of the signal output from said gates, and means for applying said signal to the vertical deflection plates of said cathode ray tube.

References Cited

UNITED STATES PATENTS

| | | | |
|---|---|---|---|
| 2,951,181 | 8/1960 | Sugarman | 315—24 |
| 3,011,129 | 11/1961 | Magleby | 328—151 |
| 3,191,072 | 6/1965 | Magleby | 328—150 X |

ROBERT L. GRIFFIN, *Primary Examiner.*

JOHN W. CALDWELL, DAVID G. REDINBAUGH,
*Examiners.*

T. A. GALLAGHER, R. K. RICKERT, Jr.,
*Assistant Examiners.*